(No Model.) 4 Sheets—Sheet 1.
G. YOUNG & F. PEARN.
APPARATUS FOR BLEACHING AND DYEING.
No. 479,383. Patented July 19, 1892.
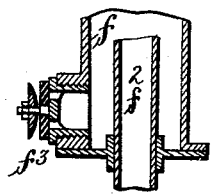
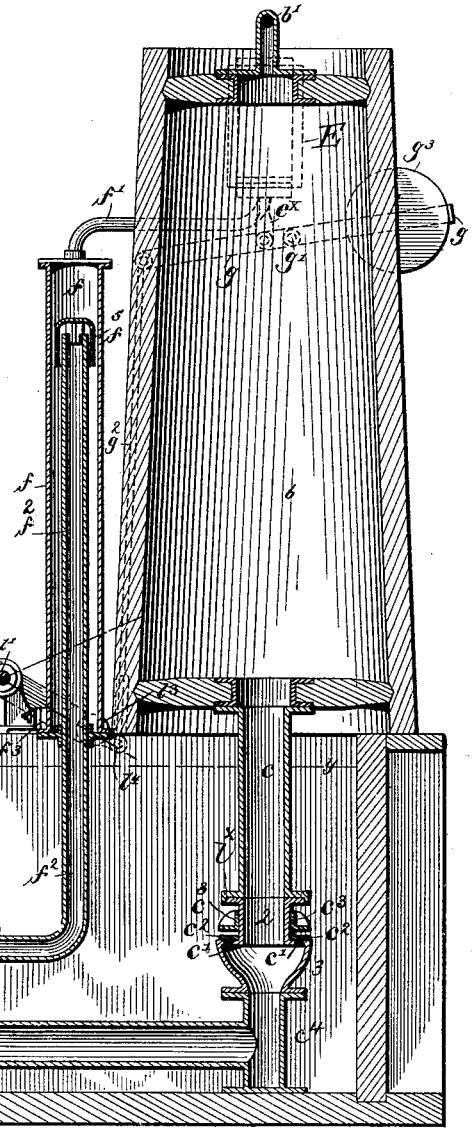
Witnesses:
H. G. Dieterich
O. W. Sommers.
Inventors
George Young, and
Frank Pearn.
By —— Atty.
THE NORRIS PETERS CO., PHOTO-LITHO., WASHINGTON, D. C.

(No Model.) 4 Sheets—Sheet 2.
G. YOUNG & F. PEARN.
APPARATUS FOR BLEACHING AND DYEING.
No. 479,383. Patented July 19, 1892.
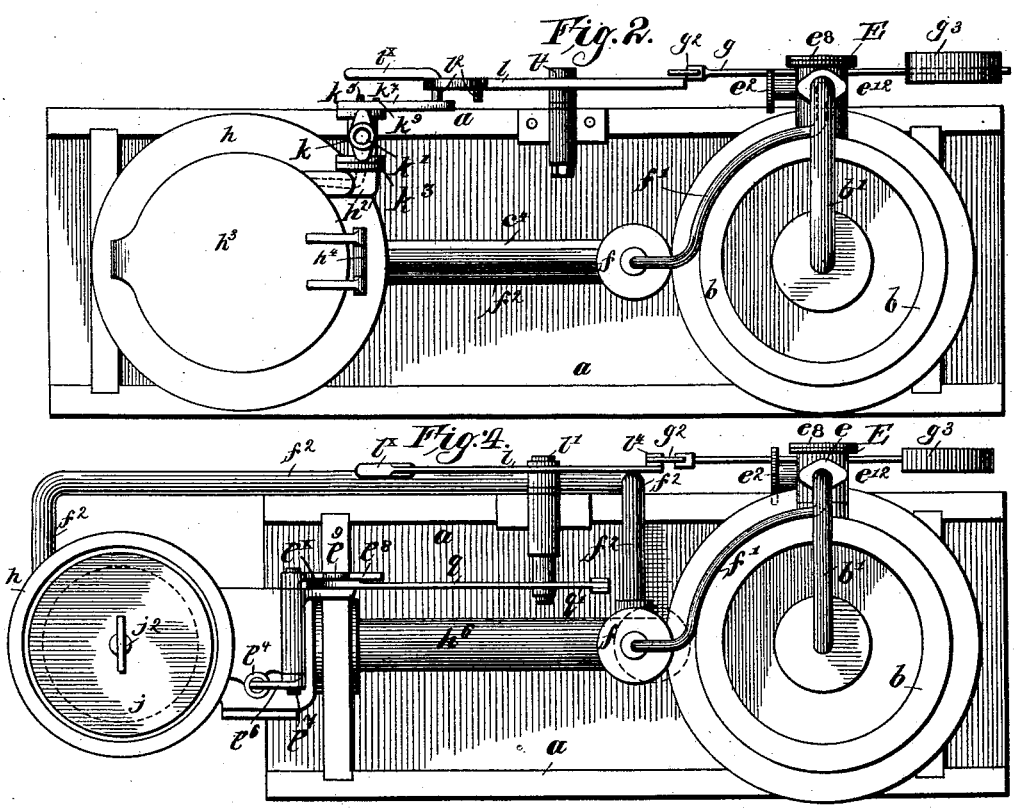
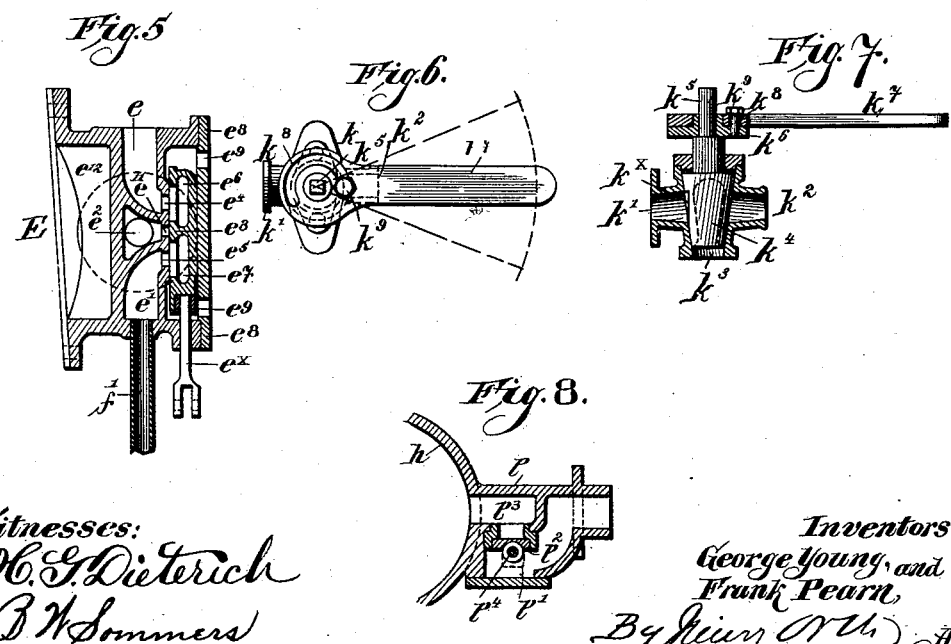
Witnesses:
H. F. Dieterich
B. W. Sommers
Inventors:
George Young, and
Frank Pearn,
By Atty.

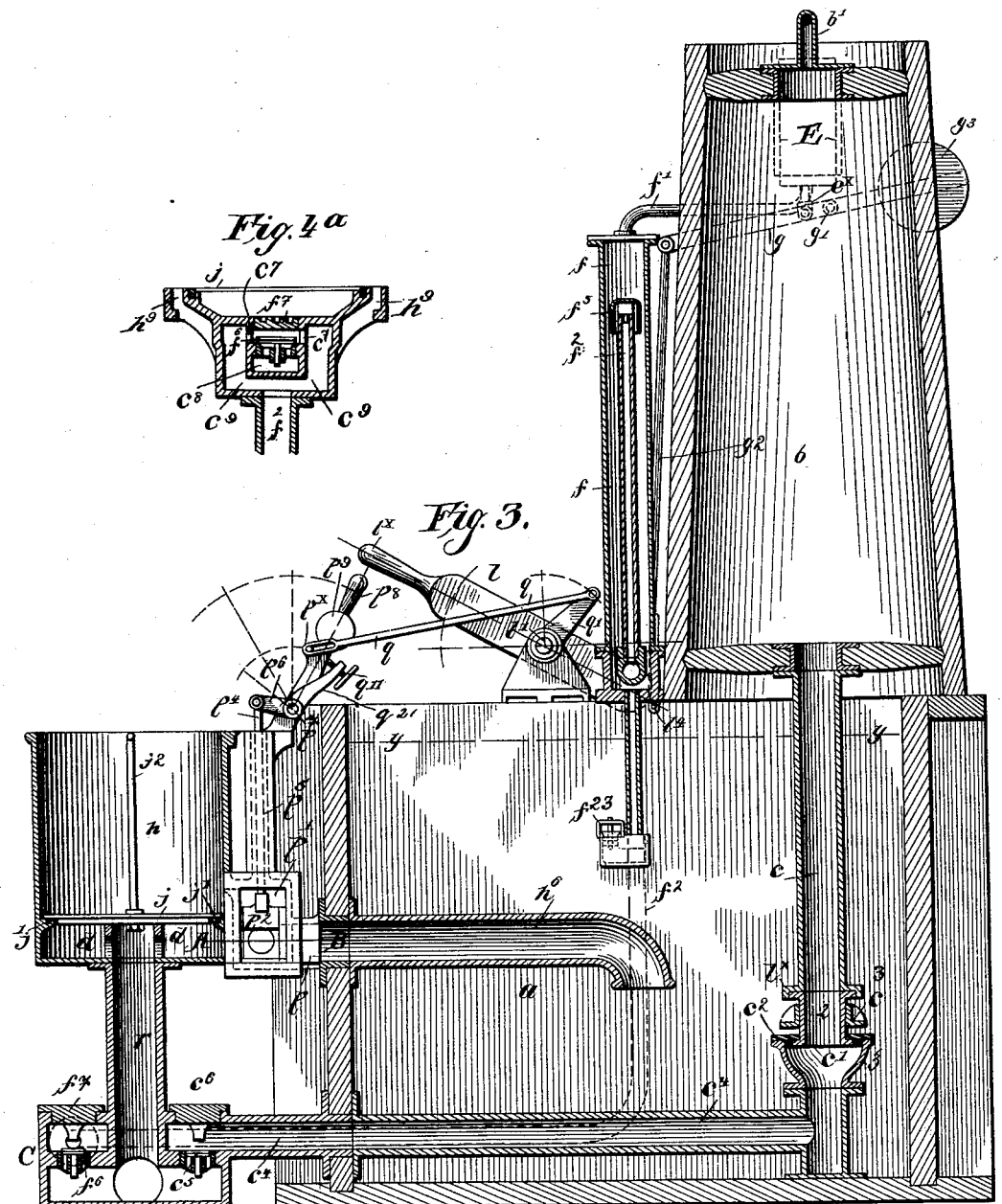

(No Model.) 4 Sheets—Sheet 4.
G. YOUNG & F. PEARN.
APPARATUS FOR BLEACHING AND DYEING.
No. 479,383. Patented July 19, 1892.
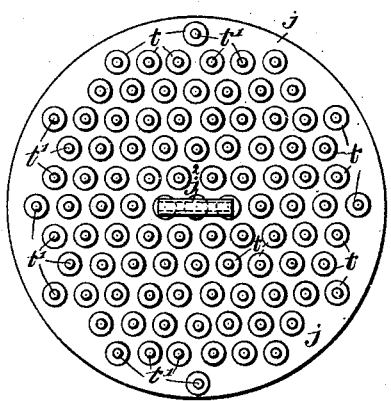
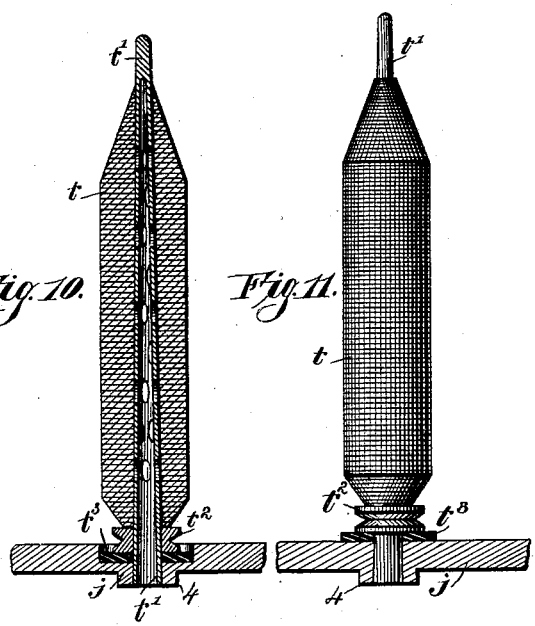
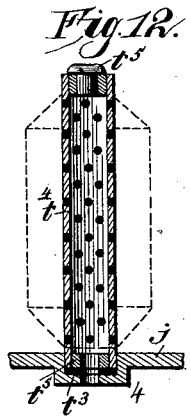
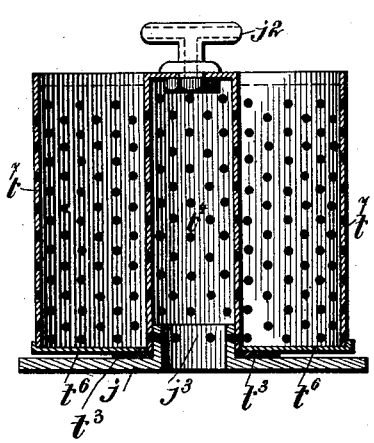
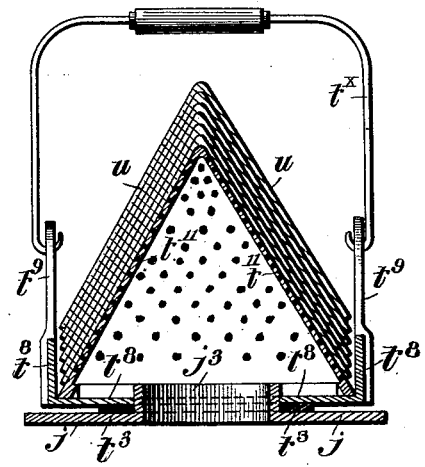
Witnesses:
H. G. Dieterich
B. W. Sommers
Inventors:
George Young and
Frank Pearn
By [signature] Atty.

UNITED STATES PATENT OFFICE.

GEORGE YOUNG, OF WINTON, AND FRANK PEARN, OF GORTON, NEAR MANCHESTER, ENGLAND; SAID PEARN ASSIGNOR TO WILLIAM CRIPPIN, OF EGERTON MILLS, PATRICROFT, NEAR MANCHESTER, ENGLAND.

APPARATUS FOR BLEACHING AND DYEING.

SPECIFICATION forming part of Letters Patent No. 479,383, dated July 19, 1892.

Application filed January 15, 1892. Serial No. 418,155. (No model.) Patented in England January 22, 1890, No. 1,157; in Brazil November 21, 1890, No. 995; in France January 23, 1891, No. 210,970; in Belgium February 18, 1891, No. 93,799; in Italy February 18, 1891, LX, 133; in Spain and Colonies August 13, 1891, No. 11,992, and in Austria-Hungary September 21, 1891.

*To all whom it may concern:*

Be it known that we, GEORGE YOUNG, residing at Winton, and FRANK PEARN, residing at Gorton, near Manchester, in the county of Lancaster, England, subjects of the Queen of Great Britain, have invented certain new and useful Improvements in Apparatus for Bleaching and Dyeing, (for which we have obtained Letters Patent in England, dated January 22, 1890, No. 1,157; in France, dated January 23, 1891, No. 210,970; in Belgium, dated February 18, 1891, No. 93,799; in Italy, dated February 18, 1891, No. 133, Vol. 60; in Spain and Colonies, dated August 13, 1891, No. 11,992; in Austria-Hungary, dated September 21, 1891, and in Brazil, dated November 21, 1890, No. 995;) and we do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

The invention relates to apparatus for dyeing and bleaching cotton, wool, silk, and other fibrous materials in the raw or in the manufactured or partly-manufactured state; and it has for its object the provision of means whereby the operation of dyeing or bleaching may be effectually and expeditiously as well as economically performed.

To these ends the invention consists in the combination of co-operative elements and mechanisms, as well as in structural features, as will now be fully described, reference being had to the accompanying drawings, in which—

Figures 1 and 3 are longitudinal sectional elevations of apparatus embodying our invention, the treating-chamber being shown below the level of the liquid in the vat in said Fig. 3. Figs. 2 and 4 are top plan views of Figs. 1 and 3, respectively. Fig. 4$^a$ is a vertical transverse section of the valve-casing $h^7$, taken centrally through one of the valve-chambers and its valve. Fig. 4$^b$ is a detail sectional view illustrating the exhaust-valve for the chamber $f$. Fig. 5 is a sectional view of the slide-valve employed in conjunction with the receiving-chambers and a suitable exhaust apparatus. Figs. 6 and 7 show a three-way cock connected with the treating-chamber by a face view and a sectional view, respectively. Fig. 8 is a section taken on line A B of Fig. 3. Fig. 9 is a plan view of a cop-supporting plate or table. Fig. 10 is a vertical section, and Fig. 11 a sectional elevation, of a cop and its spindle, illustrating different modes of seating the same fluid-tight in the cop-plate. Fig. 12 is a view similar to Fig. 10, illustrating the mode of seating a yarn spool or cylinder in its supporting plate or table; and Figs. 13 and 14 are like views of supports for yarn in the hank and for felt hats, respectively, illustrating the mode of connecting them fluid-tight with their support or table.

Like symbols indicate like parts wherever such may occur in the figures of drawings just described.

The essential elements of apparatus comprise a chamber $h$, in which the fibrous materials are treated, and hereinafter called the "treating-chamber;" a vat, tank, or reservoir $a$, that contains the bleaching or dye liquor, and hereinafter called the "vat;" and two vessels, tanks, or chambers $b$ and $f$, into which the liquor from the vat or steam, air, or gas is or may be drawn, and hereinafter called the "main" and "auxiliary" receiving-chambers, respectively, and in combination therewith of a suction apparatus whereby the liquor in the vat may be forced into the treating-chamber through the fibrous material therein and returned to the vat, or whereby the said chamber may be exhausted and steam, air, or gas drawn through the material treated, as may be required in the operations of dyeing or bleaching. The vat $a$ may be of any suitable construction and appropriate material, preferably of wood, and in practice is or may be provided with a suitable exhaust valve or cock. (Not shown.)

Referring now more particularly to Figs. 1 2, $4^a$, $4^b$, 5, 6, and 7, the vat $a$, for the sake of economy, convenience, and compactness, serves as a support for the treating-chamber $h$, as well as for the main and auxiliary receiving-chambers $b$ and $f$, said main receiving-chamber being preferably cylindrical and, like the vat, constructed of wood, and it is closed at its upper and lower ends. To the lower end or bottom of the chamber $b$ is connected a pipe $c$, that has at its lower end a recessed flange $1^\times$, in which is seated a flanged extension 2 of a valve-casing 3, that is connected with a pipe $c^4$, seated on the bottom of vat $a$ and connected with a passage $c^9$ of a valve-casing $h^7$, hereinafter to be described. The valve-casing 3, as shown, is made flaring upwardly and has ports $c'$ in its top surrounding the extension 2, adapted to be closed by a disk valve $c^2$, loose on extension 2 and limited in its movements thereon by a stop-collar $c^3$. The auxiliary receiving-chamber $f$, of less capacity than chamber $b$, is also closed at top and bottom and provided at the foot with a mushroom or other suitable valve $f^3$, as more clearly shown in Fig. $4^b$, opening outwardly to discharge liquor drawn into the chamber back into vat $a$. A pipe $f^2$ extends into chamber $f$, one end of said pipe reaching nearly to the upper end of the chamber and carrying at said end a bell-shaped hood $f^5$, the sides of which are preferably perforated, so that when a liquid and a gaseous fluid are drawn into chamber $f$ through pipe $f^2$ it will strike the hood and be more or less sprayed, thereby more effectually separating the gaseous fluid from the liquid drawn in. The other end of the pipe is connected with a passage $f^4$ of the valve-casing $h^7$, above referred to and presently to be described.

Near the upper end of the main receiving-chamber $b$ is secured a casing E for a slide-valve $e^3$, in which are formed two cavities $e^7$ $e^6$, and the casing E is provided with two passages $e$ and $e'$, respectively connected by pipes $b'$ $f'$ with the upper end of the main and auxiliary receiving-chambers $b$ and $f$ and with a port $e^2$, connected with a suction apparatus or pump, which we have deemed unnecessary to illustrate in the drawings, since any appropriate apparatus of this character may be used. The chamber in which the slide-valve $e^3$ works is closed by a cover $e^8$, in which are formed openings or ports $e^9$ to admit air freely to said chamber, and it will be understood that the valve and its stem $e^\times$ do not work fluid-tight in the said chamber; but said valve is adapted to work fluid-tight on its bearings, so as to hermetically close the ports $e^4$ $e^5$ of passages $e$ and $e'$, respectively, and the exhaust-port $e^{11}$ of passage $e^2$. In Fig. 5 we have shown the valve in its middle position, all the ports being closed, and it is obvious that when the valve is moved in one or the other direction either the port $e^4$ or the port $e^5$ will be uncovered and communication established between the pump and either the main or auxiliary receiving-chamber, according to the position of the valve relatively to the said ports. The valve-stem $e^\times$ is pivotally connected with a two-armed lever $g$, fulcrumed at $g'$ to the main receiving-chamber $b$, one arm of the lever carrying a weight $g^3$, that counterbalances the slide-valve $e^3$ and lever connections, the other arm of said lever being connected through the medium of a rod $g^2$ with one arm of a two-armed lever $l$, pivoted on a shaft $l'$, the other arm of which lever has a handle $l^\times$ and a sector or segment $l^6$, from which project two pins $l^2$ for purposes hereinafter to be described. Although we prefer under certain circumstances to secure the segment to or form the same on the lever, yet it will be understood that said segment may form a part of a separate one-armed lever secured to shaft $l'$. By means of this lever $l$ the slide-valve is actuated, as will be readily understood. The treating-chamber $h$, as hereinbefore stated, is also mounted on the vat, and consists of a casing of preferably cylindrical form, or substantially so, the lower part $h^6$ having the form of a truncated cone, the smaller end of which extends into the vat $a$. The lower part $h^6$ of the treating-vessel has an interior annular seat or shoulder formed around its upper wider end, upon which are seated radial arms $h^8$, extending from a valve-casing $h^7$, between which arms passages $h^9$ are formed, through which the liquor in the vat has free access to the upper portion of the treating-chamber $h$ whenever a partial vacuum is formed therein. The upper end of the valve-casing is made flaring outwardly and has an annular groove for the reception of a rubber or other suitable packing gasket or ring $j'$, upon which seats the table or plate $j$, that supports the fibrous material to be treated and that will be more particularly referred to hereinafter. The valve-casing $h^7$ has an axial passage $h^\times$, that places the chamber $d$ below the table $j$ in communication with a chamber $c^8$ in the valve-casing below the valve-ports therein and with the pipes $c^4$ $f^2$ through ports $c^7$, that connect the valve-chamber above the valves therein with the passages $c^9$ $f^4$, respectively, to which the pipes $c^4$ and $f^2$ are connected, $c^5$ $f^6$ being the valves that control the ports referred to, and they are limited in their movements by two removable plates $c^6$ $f^7$, that serve as covers for the valve-chamber and as a means for introducing the valves or having access thereto when this becomes necessary from any cause.

Around the upper inner end of the treating-chamber $h$ is formed an annular channel or passage $h'$, the inner wall of which is perforated, and to said channel is connected, through the medium of an elbow-pipe $h^{21}$, Fig. 2, the steam or gas branch $k^3$ of a three-way valve or cock $k$, Figs. 6 and 7, the branch $k'$ of which is connected with a steam or gas supply, while the branch $k^2$ is open to the atmosphere. The plug $k^4$ has a single port $k^\times$ leading to the axial bore thereof, and said plug may be adjusted so that either branch $k'$ or $k^2$ is brought into communication with the annular channel $h'$ through the bore of the plug and the branch $k^3$, whereby steam or a gas or air may be drawn into said channel, thence into the treating-chamber, and through the fibrous material into the auxiliary chamber $f$. On the square $k^5$ of the valve-plug $k^4$ is secured a disk $k^6$, that has a tubular hub on which is fitted a second disk that forms part of a lever $k^7$, so as to allow the disk of the latter to move freely around the hub of the disk $k^6$, which is fast on the square of the valve-plug. In the discoidal portion of the lever $k^7$ is formed a slot $k^8$, concentric with the axis of the valve-plug $k^4$, and through said slot extends a set-screw $k^9$, that is screwed into the disk $k^6$. By slackening this set-screw the valve-plug can be turned backward and forward, and by tightening the same the plug can be turned either way by means of the lever $k^7$. As there is only one port $k^\times$ in the valve-plug and as the lever can be moved through an arc of sixty degrees only, it opens and closes the steam or gas branch only and keeps closed the air branch, or vice versa, according to the adjustment of the plug for either fluid—that is to say, according as the fibrous material is to be subjected to the action of steam or a gas in dyeing or bleaching or to the action of air, or both, alternately.

By means of the described construction of three-way valves $k$ goods may be treated either with steam or a gas when the plug is in one position or with air when the plug is adjusted to a different position. The lever $k^7$ projects into the path of the pins $l^2$ on the segment $l^6$ of lever $l$, so that whenever the slide-valve is actuated the plug of the valve $k$ will be automatically positioned.

The treating-chamber $h$ is closed at top by a cover $h^3$, hinged to one side of the chamber and seating on a rubber or other packing $h^5$ to form a tight joint. This cover may, however, be dispensed with when the apparatus is used for dyeing or bleaching fibrous materials without subjecting the same to the action of steam or other gaseous fluid, as will be readily understood.

The material to be treated is supported from the table $j$, the construction of which varies with the nature of such material, and although it is preferred to use a separate apparatus for dyeing and bleaching each of the various materials yet, if desired, one and the same apparatus may be used, the variously-constructed tables being adapted for use interchangeably in the treating-chamber $h$.

Various means for securing the material to as well as various constructions of tables are shown in Figs. 9 to 13, inclusive. Fig. 9 shows a table for the support of fibrous materials in the cops, said table having a number of perforations for the tubular skewers or spindles $t'$ of the cops $t$, which must be seated fluid-tight in their bearings or perforations in the table $j$. In Figs. 10 and 11 the cop has a tubular tapering skewer $t'$, closed at its upper end or point and open at its lower end and provided with slots or openings along the tubular portion that contains the windings. The lower end of the skewer carries a washer $t^2$, that seats on a rubber or other packing $t^3$, arranged in an annular recess formed around the bearing in the table $j$, a boss 4 being formed around said bearing on the under side of the table, whereby a more extended bearing for the skewer is provided.

In Fig. 12 the core for the bobbin consists of a cylindrical barrel having in each end a wooden axially-perforated plug $t^5$, the lower plug seating fluid-tight in its bearing in the table $j$. In Fig. 13 we have shown a suitable arrangement for supporting a fabric to be dyed or bleached, the table having a single axial bearing $j^3$, on which is fitted a central perforated barrel or cylinder $t^4$, the perforations at the lower end registering with corresponding perforations in the bearing $j^3$ of table $j$. The central cylinder is closed at top and has a T-handle $j^2$ secured thereto, a like handle being secured to the table $j$, (shown in Fig. 9,) by means of which they may be lifted into and out of the receiving-chamber. The central cylinder $t^4$, Fig. 13, is surrounded by an outer open-ended cylinder $t^7$, and both cylinders are seated on a detachable bottom $t^6$, between which and the table $j$ is interposed a packing $t^3$, applied around the axial-bearing $j^3$ to form a tight joint, the outer casing being open at top and having perforations in its sides to admit of free access of the liquor to the cloth wound on the central cylinder.

In Fig. 14 we have shown a table for the support of felt-hat forms $u$. These are stacked on a support $t^{11}$, seated on a disk $t^8$, that has an axial opening fitting around a bearing $j^3$, formed around a central opening in the table $j$, said disk $t^8$ seating, also, on an intervening packing-ring $t^3$. The disk has vertical arms $t^9$, to which is pivoted a bail or yoke-handle $t^\times$.

When the goods are to be treated in a closed chamber, the handles $j^2$, Figs. 9 and 13, are tubular and open at both ends, so that the air in the chamber may be exhausted therefrom as the liquid is drawn in, (see, also, Fig. 1,) the lower open end of the handle communicating with the central opening in the table $j$ and the chamber $d$ and axial passage $h^\times$ of the valve-casing $h^7$. This may, however, also be accomplished by connecting a pipe with the said exhaust-passage $h^\times$ or the chamber $d$ above the same, said pipe extending to the upper portion of the treating-chamber $h$ or to a point above the highest possible level of the liquid therein, as will be readily understood.

In the apparatus described and shown in Fig. 1 the treating-chamber $h$ is located above the highest possible level—say, for instance, above the level $y$ $y$—of the liquor in the vat $a$. This, however, is not absolutely necessary, as said chamber may be located below said level, or substantially so, as shown in Fig. 2, which modification we will now describe. In either construction of apparatus, however, the main receiving-chamber should be of a capacity about equal to that of the vat, so that the greater portion of the contents thereof may be exhausted into said chamber, while the auxiliary receiving-chamber is of such a capacity as to receive any liquid that may be drawn into the same with the air, steam, or a gas drawn through the material under treatment.

In the modification shown in Fig. 2 no provisions are made for subjecting the material treated to the action of steam or a gas. Hence the treating-chamber $h$ is open at top to admit air freely thereto, and near its bottom it is provided with an annular flange or seat, in the upper face of which is formed a groove for the reception of a rubber packing-ring $j'$, upon which seats the table $j$, said table being further supported by an open-work stool or brackets to form the exhaust-chamber $d$ below the table, the same as in the apparatus described in reference to Fig. 1. The treating-chamber $h$ has secured to its bottom a pipe $r$, on the lower end of which is arranged a valve-casing C, containing the two mushroom-valves $f^6 c^5$, said pipe $r$ leading to a chamber below the valves, while the chamber above said valves is connected with the pipe $c^4$ in communication with the main receiving-chamber $b$ and with the pipe $f^2$ in the auxiliary receiving-chamber $f$ through the medium of a pipe $f^2$, that is in this construction arranged outside of the vat, as shown in dotted lines. The auxiliary receiving-chamber, instead of being provided with a mushroom-valve, has a depending pipe, at the foot of which is arranged a valve-casing, in which is seated a puppet-valve $f^{23}$, whose stem is guided in a suitable yoke-bearing, as shown. The said chamber above the valves $f^6 c^5$ has openings in its roof normally closed by two covers $f^7 c^6$, for purposes above described, in respect of the like valves shown in Fig. 1, and from said plates projects a foot or lug that limits the movement of the valves from their seats.

The treating-chamber $h$ above table $j$ can be placed in communication with a pipe $h^6$, that opens into the vat $a$, through the medium of a sluice-valve $p^2$ in a valve-box $p'$ in branch $p$, to which the pipe $h^6$ is connected. The spindle $p^4$ of the valve is guided in and extends through a tubular bearing $p^5$ and has its upper end pivoted to one arm $p^6$ of a bell-crank or angle lever that is fulcrumed on a stud $p^7$, secured to a bracket projecting from the tubular bearing $p^5$. The arm $p^8$ of the angle-lever carries a weight $p^9$, so that when said arm passes beyond a vertical intersecting the lever-fulcrum the weight will carry the lever-arm over by gravity when said lever is moved in one or the other direction to open or close the valve $p^2$. The necessary movements are imparted to the lever-arm $p^8$ either by hand, said arm terminating in a handle, or from the hand-lever $l$, that operates the slide-valve, through the following instrumentalities: On the shaft $l'$ of lever $l$ is secured a radial arm $q'$, to which is pivoted one end of a connecting-rod $q$, whose opposite end is slotted for the reception of a pin $p^x$, projecting from the lever-arm $p^8$, so that the slide-valve $e^7$ and the sluice-valve $p^2$ are moved successively. On the fulcrum-stud of the lever $p^6 p^8$ is secured a radial arm $q^{21}$, that has a set-screw $q^{11}$, working in a threaded opening formed in the outer end of said arm, on which set-screw the arm $p^8$ of the lever has bearing, whereby the lift or extent of opening of the valve $p^2$ may be adjusted. Inasmuch as the treating-chamber $h$ is open, the cop-supporting table has a solid handle $j^2$ instead of a tubular one, as described in reference to Fig. 1.

In the treatment of cloth or felt hats the treating-chamber $h$ in either construction of machine may be of such diameter as to accommodate a single table, or it may be made sufficiently large to accommodate a plurality of such tables with their supports for the cloth or hats described in reference to Figs. 13 and 14. In dyeing or bleaching we have found it more economical and expeditious to employ a separate machine for each operation. In dyeing, for instance, one machine may be used for mordanting and another for dyeing and treating the dyed material with air or steam or a gas. In bleaching one machine may be used for cleansing or scouring by subjecting the material alternately to the action of a solution of caustic soda, for instance, and to that of steam. Another machine may be used for washing and another for treating the material with a bleaching agent, either liquid or gaseous. In this manner the operations may be carried out successively in their proper order by a simple transfer of the tables $j$ with the material thereon from the treating-chamber of one machine to that of another.

With our improved machines the liquor used can be readily filtered, if desired, by simply substituting a perforated plate for the table $j$ and securing thereto a filter-cloth. The liquor may then be drawn through said filter-cloth and into the receiving-chamber $b$, the sediments or solid matter being removed from the filter before any material is treated, the liquor being returned to the vat after filtration. Of course such filtration may be effected in a special apparatus.

The operation of our machine may be briefly described as follows, referring to Fig. 1: If the liquor or dye used is to be first filtered, it is introduced into the vat, and instead of the table $j$ a perforated plate provided with filter-cloth is substituted therefor, the pump (not shown) is started, and the slide-valve set so as to establish communication between pipe $b'$ and the valve ports and passage $e^{11}$, $e^4$, and $e$, respectively, whereby a partial vacuum is formed in the main receiving-chamber $b$ and in the seating-chamber $h$ through pipe $c^4$, passage $c^9$, the chamber above valve $c^5$, which moves off its seat, the chamber below said valve, the axial passage $h^\times$, and the chamber $d$ below the filter-plate. The liquid in the vat $a$ is thereby lifted and drawn through the filter and by the way described through the pipe $c^4$ into receiving-chamber $b$, the valve $c^2$, interposed in pipes $c^4$ $c$, closing under the action of such partial vacuum. When all the liquid has been filtered and the solid matter and filter-plate removed, the slide-valve is set to admit air to chamber $b$, such air having free access to the slide-valve casing, as hereinbefore described, when the partial vacuum in said chamber will be destroyed and the liquid will at once flow down into pipe $c^4$, thereby lifting the valve $c^2$ and flowing back into vat $a$. The same operation takes place when the liquid is drawn through the material to be treated, the table $j$ with such material being placed in the treating-chamber $h$, the slide-valve being operated by means of the lever $l$. After the material has been subjected to the action of the liquid for a sufficient length of time and it is desired to treat the same with air or steam the slide-valve $c^7$ is set to establish communication between the slide-valve ports and passage $e^{11}$, $e^5$, and $e'$, respectively, and the pipe $f'$ of the auxiliary chamber $f$, whereby a partial vacuum is produced in said chamber and in the treating-chamber through pipe $f^2$, passage $f^4$, passage $c^7$ above valve $f^6$, which opens (under partial vacuum) the suction-chamber $c^8$ below the valve, axial passage $d^\times$, chamber $d$ below table $j$, and through the material. As the slide-valve is moved into the position referred to the cock $k$, through the instrumentalities described, is also positioned to admit steam, for instance, from branch $k'$ into the closed treating-chamber $h$ through the annular passage $h'$. The steam is thus drawn into the auxiliary chamber together with any liquid that may be drawn from the material or may be in the valve-casing, such liquid being projected against the under side of the hood $f^5$ for purposes already stated, and as soon as the vacuum in chamber $f$ is destroyed by shifting the slide-valve the liquid therein will flow back into the vat $a$, the mushroom-valve $f^3$, which was held to its seat under the action of the partial vacuum, opening under the pressure of the liquid.

The general operation of the apparatus shown in Fig. 2 is substantially the same, except that no provision is made for the use of steam or a gas, except air, and when air is to be drawn through the material in the open treating-chamber $h$, after having been subjected to the action of the liquid in the vat, the slide-valve is set to establish communication between the suction-passage and the auxiliary receiving-vessel $f$, the sluice-valve $p^2$ being closed. A partial vacuum will be formed in chamber $f$, under which the valve $f^6$ will move off its seat, and the ambient air in the treating-chamber $h$ will be drawn through the material. In this form of apparatus the setting of the slide-valve to establish communication between the passage and the main receiving-chamber $b$ will also open the sluice-valve $p^2$, the liquor in vat $a$ being drawn through pipe $h^6$ into valve-casing, thence through valve-port into chamber $p^3$, Fig. 6, whence it will rise into the treating-chamber $h$. When, on the contrary, the slide-valve is set to establish communication with the auxiliary receiving-vessel $f$, the sluice-valve $p^2$ is closed through the instrumentalities above described.

The time during which the material is to be subjected to the action of the liquor in the vat $a$ may be determined by a graduated scale applied within the vat, indicating various levels of the liquid, the quantity of liquid drawn through the material determining the time.

Having thus described our invention, what we claim as new therein, and desire to secure by Letters Patent, is—

1. In a machine of the class described, the combination of a vat, a treating-chamber in communication with and having its lower end below the level of the liquid in the vat, a receiving-chamber in communication with the treating-chamber and vat through a valved passage, a table for the material to be treated covering the mouth of said valved passage within the treating-chamber and having a port or ports opening into the passage, and a suitable exhausting apparatus adapted to draw the liquid from the vat into the treating-chamber through the port or ports in the table to and through the valved passage into said receiving-chamber, for the purpose set forth.

2. In a machine of the class described, the combination of a vat, a treating-chamber in communication with and having its lower end below the level of the liquid in the vat, a receiving-chamber in communication with the treating-chamber and vat through a valved passage, a table for the material to be treated covering the mouth of the passage within the treating-chamber and having a port or ports opening into said passage, an air-exhaust in communication with the passage and treating-chamber, and a suitable exhausting apparatus connected with the receiving-chamber, for the purpose set forth.

3. In a machine of the class described, the combination of a vat, a treating-chamber arranged above the level of the liquid in the vat, a connection between the chamber and vat having its inlet below the level of the liquid, a receiving-chamber in communication with the treating-chamber and vat through a valved passage, a table for the material to be treated covering the mouth of said valved passage within the treating-chamber and having a port or ports opening into the passage, and a suitable exhausting apparatus adapted to draw the liquid from the vat into the treating-chamber through the port or ports in the table to and through the valved passage into said receiving-chamber, for the purpose set forth.

4. In a machine of the class described, the combination of a vat, a treating-chamber arranged above the level of the liquid in the vat, a connection between the chamber and vat having its inlet below the level of the liquid, a receiving-chamber in communication with the vat and treating-chamber through a valved passage, a table for the material to be treated detachably seated on the mouth of said passage within the treating-chamber, and a suitable exhausting apparatus connected with the receiving-chamber, for the purpose set forth.

5. In a machine of the class described, the combination, with a vat, a treating-chamber, and a tubular connection between the two having its inlet below the level of the liquid in the vat, of two receiving-chambers in communication with the vat and treating-chamber through independent valved conduits, a chamber common to both conduits within the treating-chamber, a table for the material to be treated covering said chamber for the conduits and having one or more ports, and suitable exhausting devices connected with the receiving-chambers, for the purpose set forth.

6. In a machine of the class described, the combination, with a vat, a treating-chamber, and a tubular connection between the two having its inlet below the level of the liquid in the vat, of two receiving-chambers of unequal capacities in communication with the vat and treating-chambers through independent valved conduits, a chamber common to both conduits within the treating-chamber, a table for the material to be treated covering said chamber for the conduits, and an exhausting apparatus adapted to be connected with either receiving-chamber, for the purpose set forth.

7. In a machine of the class described, the combination, with a vat, a treating-chamber closed at one end by a cover and luted at the opposite end by the liquid in the vat, a duct formed around the upper end of the treating chamber and communicating therewith, and a three-way valve connected with said duct, of two receiving-chambers connected with the vat and treating-chambers through independent valved conduits, a chamber common to two of the conduits within the treating-chamber, a table covering said chamber for the conduits and having one or more ports, and an exhausting device adapted to be connected with either receiving-chamber, for the purpose set forth.

8. In a machine of the class described, the combination, with a vat, a treating-chamber in communication therewith below the level of the liquid therein, a receiving-chamber in communication with the treating-chamber and vat through a valved duct, and a table seated on said valved duct within the treating-chamber and having a port or ports leading to the chamber and duct, of an exhausting device, a slide-valve having a port or passage adapted to be connected with said device and the receiving-chamber, and a lever for actuating the slide-valve, for the purpose set forth.

9. In a machine of the class described, the combination, with a vat, a treating-chamber in communication therewith below the level of the liquid therein, two receiving-chambers, independent valved ducts connecting the receiving-chambers with a chamber located in the treating-chamber above the level of such liquid, a table provided with a port or ports seated on the chamber in said treating-chamber, and valved passages connecting the receiving-chamber with the vat, of an exhausting device, a slide-valve adapted to connect either receiving-chamber with the exhausting device, and a lever for operating the slide-valve, for the purpose set forth.

10. In a machine of the class described, the combination, with a vat, a treating-chamber in communication therewith below the level of the liquid therein, said treating-chamber being closed at top and having a duct encompassing the upper end thereof and in communication therewith, a three-way cock connected with said duct, two receiving-chambers, independent valved ducts connecting the receiving-chamber with a chamber located within the treating-chamber above the level of the liquid in the vat, a table provided with one or more ports seated on the chamber within said treating-chamber, and valved passages connecting the receiving-chambers with the vat, of an exhausting device, a slide-valve adapted to connect either receiving-chamber with said device, and a lever arranged and adapted to simultaneously operate the slide-valve and three-way cock, for the purpose set forth.

11. The combination, with the vat $a$, the treating-chamber $h$, seated thereon and extending into the same, the valve-casing $h^7$, constructed with the upper flaring portion $d$ and having valves $c^5$ $f^6$, two passages $c^7$ $c^7$, leading to the valve-chamber above said valves, and a central passage leading to the flaring portion $d$ and to the valve-chamber below the valves, and a table having one or more ports seated fluid-tight on said flaring portion of the valve-casing, of two receiving-chambers $b$ $f$, two pipes connecting the receiving-chambers with the two passages $c^7$, and a suitable exhausting device adapted to be connected with either of the receiving-chambers, for the purpose set forth.

12. The combination, with the vat $a$, the treating-chamber $h$, seated thereon and extending into the same, the valve-casing $h^7$, constructed with the flaring portion $d$ and having valves $c^5$ $f^6$, two passages $c^7$ $c^7$, leading to the valve-chamber above the valves, and a central passage leading to the flaring portion $d$ and to the valve-chamber below the valves, and a table having one or more ports seated fluid-tight on said flaring portion of the valve-casing, of two receiving-chambers $b$ $f$, two pipes connecting the receiving-chambers with the passages $c^7$ $c^7$, respectively, discharge-valves operating automatically to discharge the contents of the receiving-chambers into the vat, and an exhausting device adapted to be connected with either of the receiving-chambers, for the purpose set forth.

13. The combination, with the treating-chamber and an exhaust-chamber located therein so as to form passages between the two, of the perforated table $j$, seating on said exhaust-chamber and forming the top thereof, said table having an open-ended hollow handle, for the purpose set forth.

14. The combination, with the treating-chamber, a three-way cock provided with an operating-handle, the receiving-chambers $b$ $f$, a slide-valve casing having passages connected with said chambers, and a slide-valve controlling the said passages, of a lever connected with the slide-valve and a segment on the lever or lever-fulcrum having two pins adapted to engage the handle of the three-way cock, for the purpose set forth.

15. The combination, with the receiving-chambers $b$ $f$, of a slide-valve casing having passages $e$ $e'$ connected with said chambers, a suction-passage adapted to be connected with a suction apparatus, and ports $e^4$ $e^5$ $e^{11}$ of the slide-valve $e^8$, adapted to control said ports, and a cover for the valve-casing provided with air-ports $e^9$, substantially as and for the purpose set forth.

GEORGE YOUNG.
FRANK PEARN.

Witnesses:
PETER J. LIVSEY,
WILLIAM FAULKNER.